United States Patent
Moon et al.

(10) Patent No.: US 8,297,078 B2
(45) Date of Patent: Oct. 30, 2012

(54) FLOAT BATH FOR MANUFACTURING FLOAT GLASS HAVING A COOLING DEVICE

(75) Inventors: Won-Jae Moon, Seoul (KR); Yang-Han Kim, Goyang-si (KR); Sang-Oeb Na, Seoul (KR); Jeong-Deok Kim, Seoul (KR); Heui-Joon Park, Paju-si (KR); Jin Han, Goyang-si (KR); Woo-Hyun Kim, Dongducheon-si (KR); Dong-Shin Shin, Icheon (KR); Jae-Han Jun, Paju-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/207,208

(22) Filed: Aug. 10, 2011

(65) Prior Publication Data

US 2012/0040817 A1    Feb. 16, 2012

(30) Foreign Application Priority Data

Aug. 11, 2010    (KR) .................. 10-2010-0077573

(51) Int. Cl.
*C03B 18/18* (2006.01)
(52) U.S. Cl. ............ 65/182.3; 65/99.2; 65/204; 65/99.3
(58) Field of Classification Search ........... 65/99.1–101, 65/89, 193, 253–259
See application file for complete search history.

(56) References Cited

U.S. PATENT DOCUMENTS

| | | | | |
|---|---|---|---|---|
| 1,893,061 A * | 1/1933 | Peiler | ............................... | 65/346 |
| 2,042,660 A * | 6/1936 | Hulton | ............................... | 432/4 |
| 2,199,355 A * | 4/1940 | Underwood | .................... | 65/137 |
| 3,574,589 A * | 4/1971 | Yockey | ........................... | 65/268 |
| 3,628,596 A * | 12/1971 | Easton et al. | ................ | 164/440 |
| 3,658,504 A * | 4/1972 | Loukes et al. | ............... | 65/182.3 |
| 3,894,859 A * | 7/1975 | Scott et al. | ..................... | 65/99.2 |
| 3,918,950 A * | 11/1975 | Stilley | ............................ | 65/114 |
| 4,174,956 A * | 11/1979 | Gagne | ........................... | 65/99.3 |
| 4,197,106 A * | 4/1980 | Trevorrow et al. | ............. | 65/99.3 |
| 4,402,722 A * | 9/1983 | Edge | ............................... | 65/99.3 |
| 4,711,655 A * | 12/1987 | Schultz | .......................... | 65/351 |
| 4,946,491 A * | 8/1990 | Barr | ................................ | 65/114 |
| 6,401,490 B1 * | 6/2002 | Yoshizawa et al. | ............ | 65/25.4 |
| 8,051,677 B1 * | 11/2011 | Moon et al. | .................... | 65/99.3 |
| 8,136,374 B2 * | 3/2012 | Moon et al. | .................... | 65/162 |
| 2001/0002735 A1 * | 6/2001 | Hirota et al. | ................... | 264/2.2 |
| 2001/0023166 A1 * | 9/2001 | Huynh et al. | ................... | 451/73 |
| 2002/0038559 A1 * | 4/2002 | Hishinuma et al. | ............. | 65/99.2 |
| 2004/0065115 A1 * | 4/2004 | Mueller et al. | ............... | 65/29.17 |
| 2004/0126577 A1 * | 7/2004 | Lee et al. | ....................... | 428/364 |
| 2004/0134202 A1 * | 7/2004 | Omura et al. | .................... | 62/64 |
| 2004/0191358 A1 * | 9/2004 | Gellert et al. | ................. | 425/570 |
| 2006/0252356 A1 * | 11/2006 | Webster | .......................... | 451/65 |
| 2008/0098954 A1 * | 5/2008 | Banks | ........................... | 118/300 |
| 2008/0223079 A1 * | 9/2008 | Kamihori et al. | .............. | 65/99.3 |

(Continued)

*Primary Examiner* — Matthew Daniels
*Assistant Examiner* — Jodi C Franklin
(74) *Attorney, Agent, or Firm* — McKenna Long & Aldridge LLP (57) ABSTRACT

A float bath for manufacturing a float glass includes a brick assembly composed of a plurality of bricks to store a molten metal so that a float glass is capable of moving forward while floating on the molten metal, a bottom casing for forming an outer side of the brick assembly, and an air blower installed away from the bottom casing to supply a cooling air toward the bottom casing. The air blower is disposed so that the cooling air is injected toward gaps between the bricks.

4 Claims, 8 Drawing Sheets

U.S. PATENT DOCUMENTS

| | | | |
|---|---|---|---|
| 2009/0255264 A1* | 10/2009 | McMasters et al. | 60/747 |
| 2010/0006670 A1* | 1/2010 | Bourrilhon et al. | 239/240 |
| 2010/0223956 A1* | 9/2010 | Moon et al. | 65/169 |
| 2010/0223957 A1* | 9/2010 | Moon et al. | 65/182.3 |
| 2011/0123668 A1* | 5/2011 | Budapanahalli | 425/573 |
| 2011/0283740 A1* | 11/2011 | Moon et al. | 65/99.3 |
| 2012/0040817 A1* | 2/2012 | Moon et al. | 501/11 |
| 2012/0040818 A1* | 2/2012 | Moon et al. | 501/11 |

* cited by examiner

FLOAT BATH FOR MANUFACTURING FLOAT GLASS HAVING A COOLING DEVICE

CROSS-REFERENCE TO RELATED APPLICATION

This application claims priority under 35 USC 119(a) to Korean Patent Application No. 10-2010-0077573 filed in the Republic of Korea on Aug. 11, 2010, the entire contents of which are incorporated herein by reference.

BACKGROUND OF THE INVENTION

1. Field of the Invention

The present disclosure relates to a float bath for manufacturing a float glass and a cooling method of the same. More particularly, the present disclosure relates to a float bath for manufacturing a float glass, having an improved structure for cooling a bottom casing surrounding bricks storing a molten metal, and a cooling method of the same.

2. Description of the Related Art

Generally, an apparatus for manufacturing a float glass (also known as sheet glass, flat glass, or plate glass) using a float glass process is used to manufacture a band-shaped (or, ribbon-shaped) float glass having predetermined width and thickness by continuously supplying molten glass onto a flowing molten metal stored in a float bath, floating the molten glass on the molten metal to form a molten glass ribbon, and pulling up the glass ribbon toward an annealing lehr near an exit of the float bath.

Here, the molten metal includes, for example, molten tin or molten tin alloy and has a greater specific gravity than the molten glass. The molten metal is received in a float chamber where reducing hydrogen ($H_2$) and/or nitrogen ($N_2$) gas is filled. The float chamber includes a bottom storing molten metal and a roof covering the bottom. In addition, the bottom (or, the float bath) storing molten metal has a horizontally extending structure and includes a high heat resistant material therein. The molten glass is supplied from an upstream side of the float bath onto the surface of the molten metal and forms a molten glass ribbon while moving to a downstream side. The molten glass ribbon is lifted up at a location (hereinafter, referred to as a take-off point) set on the downstream side of the float bath to be kept away from the molten metal, and is delivered to an annealing lehr of the next process.

Meanwhile, the molten metal in the float chamber is maintained at a high temperature (about 600° C. to 1,100° C.) and has a melting point of 232° C. Therefore, the bottom portion of the float bath needs to cool to a predetermined temperature. Otherwise, the molten metal may react with a base casing made of carbon steel material to create holes in the base casing, which may allow the molten metal to leak out of the float bath. In addition, in aspect of quality, if the inner temperature of the float bath changes (for example, −5° C. to +5° C.), the flow of the molten metal changes to generate bubbles, which may cause surface defects (for example, OBB (Open Bottom Bubble) or BOS (Bottom Open Seed) to a final product of the float glass. Therefore, the final product of the float glass produced through the float bath should maintain uniform temperature distribution in the float bath in aspect of quality, particularly OBB.

However, a general float bath system cools the bottom of the float bath by blowing a cooling air to the bottom casing by using an air blower. The cooling device using such an air blower uses a plurality of nozzles. However, the nozzles are arranged randomly without considering the location of bricks surrounded by the bottom casing located above the nozzles, resulting in a problem in cooling efficiency.

SUMMARY OF THE INVENTION

The present invention is designed to solve the problems of the prior art, and therefore it is an object of the present disclosure to provide a float bath for manufacturing a float glass having an improved structure for maximizing a cooling effect for a bottom casing by efficiently utilizing gaps between bricks in the bottom of the float bath. Another object of the present disclosure is to provide a cooling method of the float bath.

In one aspect, there is provided a float bath for manufacturing a float glass, including: a brick assembly composed of a plurality of bricks storing molten metal so that a float glass is capable of moving forward while floating on the molten metal; a bottom casing for forming an outer side of the brick assembly; and an air blower installed away from the bottom casing to supply a cooling air toward the bottom casing, wherein the air blower is disposed so that the cooling air is injected toward gaps between the bricks.

In another aspect, there is also provided a float bath for manufacturing a float glass, including: a brick assembly composed of a plurality of bricks storing molten metal so that a float glass is capable of moving forward while floating on the molten metal; a bottom casing for forming an outer side of the brick assembly; and an air blower installed away from the bottom casing to supply a cooling air toward the bottom casing, wherein the air blower is disposed so that the cooling air is injected exactly to a center of a border of adjacent bricks.

Preferably, the air blower includes a plurality of nozzle assemblies disposed away from the bottom casing by a predetermined distance, and each of the nozzle assemblies includes: a center nozzle oriented toward a center of a border of adjacent bricks; a long side nozzle unit disposed to be oriented toward a border of long sides of the bricks from the center nozzle; and a short side nozzle unit disposed to be oriented toward a border of short sides of the bricks to cross the long side nozzle unit at a right angle.

Preferably, the air blower includes a plurality of nozzle assemblies disposed away from the bottom casing by a predetermined distance, and each of the nozzle assemblies includes a radial nozzle unit capable of injecting a cooling air in a radial direction from a center of a border of the bricks within a predetermined radius.

In another aspect, there is provided a method of cooling a float bath for manufacturing a float glass, wherein a bottom casing surrounding a brick assembly capable of storing a molten metal so that a float glass moves forward while floating on the molten metal is cooled by an air supplied from a plurality of nozzle assemblies installed below the bottom casing, and wherein the method includes setting a location of the air blower so that the cooling air is injected exactly to a gap of the bricks of the brick assembly.

In another aspect, there is also provided a method of cooling a float bath for manufacturing a float glass, wherein a bottom casing surrounding a brick assembly capable of storing a molten metal so that a float glass moves forward while floating on the molten metal is cooled by an air supplied from a plurality of nozzle assemblies installed below the bottom casing, and wherein the method includes setting a location of the air blower so that the cooling air is injected exactly to a center of a border of adjacent bricks.

The float bath for manufacturing a float glass and its cooling method may enhance the cooling efficiency since the center of the nozzles of the air blower for injecting a cooling air is located corresponding to a center of borders of bottom bricks so that the cooling air injected from the nozzles cools the gaps of the borders of the bottom bricks in a relatively shorter time. Therefore, the cooling air injected from the nozzles of the air blower may efficiently cool the bottom casing.

Therefore, if the bottom casing of the float bath is effectively cooled, it is possible to further improve the quality of a final float glass product and to ensure stable processes.

BRIEF DESCRIPTION OF THE DRAWINGS

Other objects and aspects of the present invention will become apparent from the following descriptions of the embodiments with reference to the accompanying drawings in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, a float bath for manufacturing a float glass and a cooling method of the same according to a preferred embodiment of the present disclosure will be described in detail with reference to the accompanying drawings.

Figure 1:
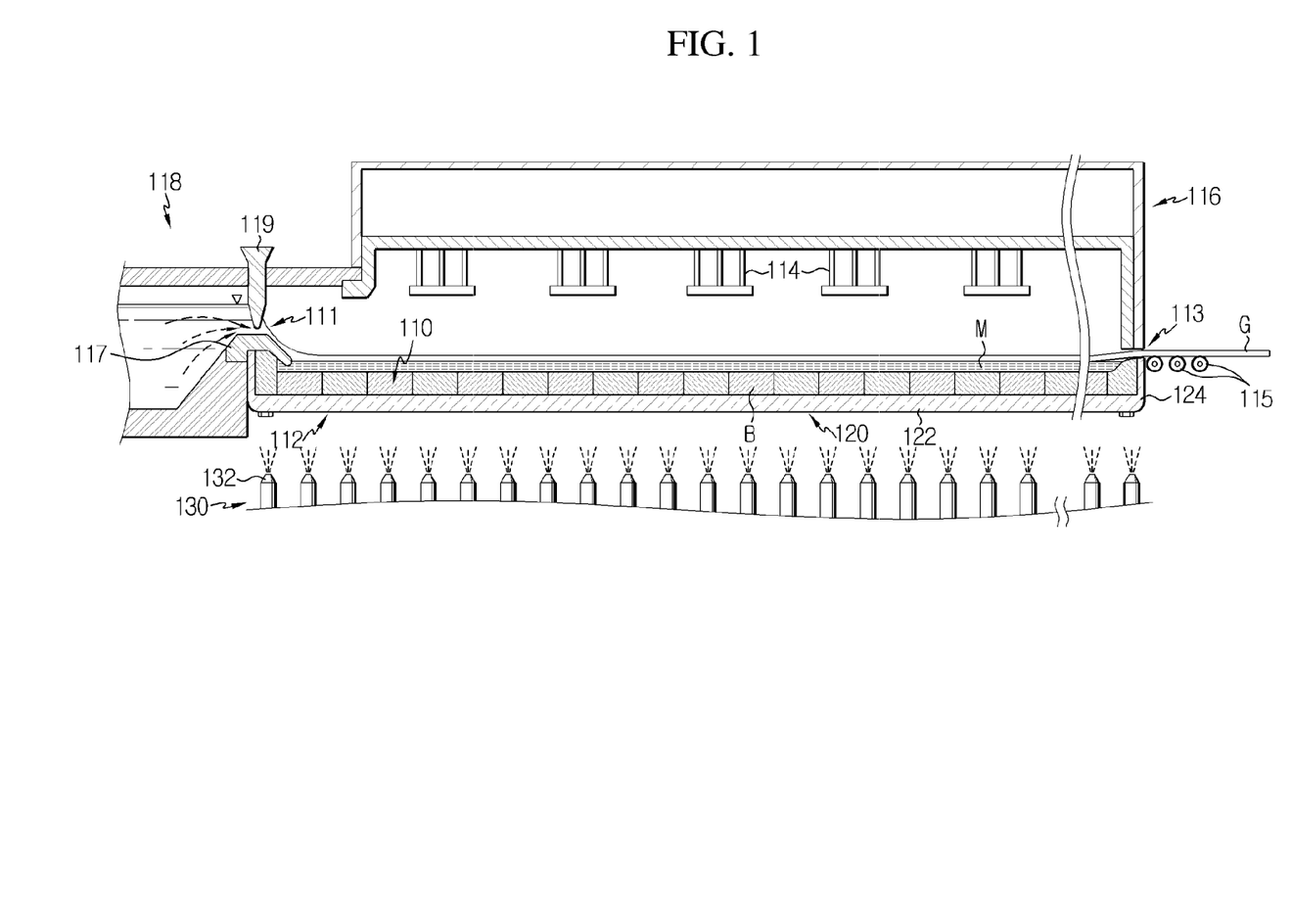
FIG. 1 is a front view schematically showing a float bath for manufacturing a float glass according to a preferred embodiment of the present disclosure.
Figure 2:
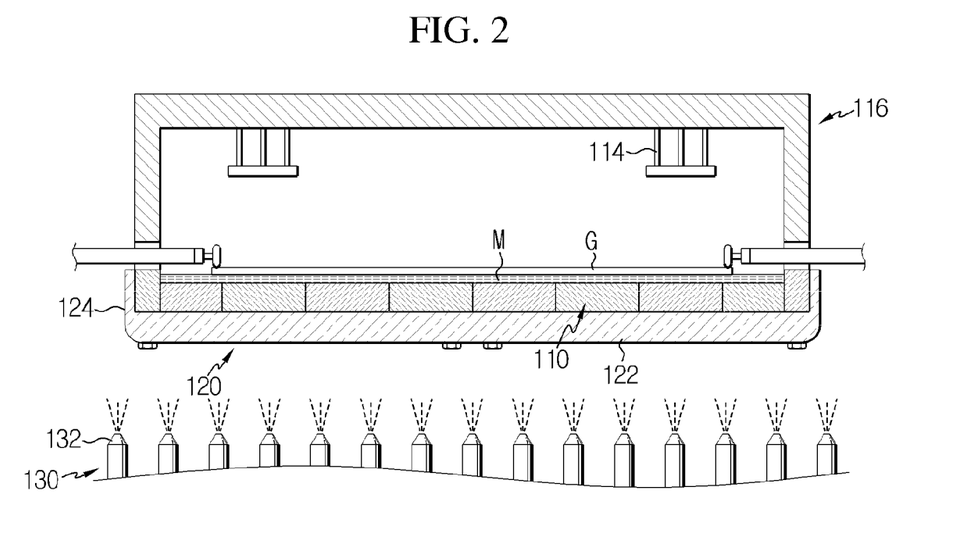
FIG. 2 is a side view showing the float bath of FIG. 1.

FIG. 1 is a front view schematically showing a float bath for manufacturing a float bath according to the preferred embodiment of the present disclosure, and FIG. 2 is a side view showing the float bath of FIG. 1.

Referring to FIGS. 1 and 2, a float bath 100 for manufacturing a float glass according to this embodiment includes a brick assembly 110 in which a plurality of bricks B are connected to each other so that a molten metal M is received therein, a steel bottom casing 120 installed to surround the outer side of the brick assembly 110, and an air blower 130 capable of injecting a cooling air toward the bottom casing 120 in order to cool the bottom casing 120.

The float bath 100 of this embodiment is used for manufacturing a float glass by means of a so-called floating method and has a float chamber 118 including a bottom 112 and a roof 116 covering the upper portion of the bottom 112 and having electric resistance heating elements 114 installed thereto. The float chamber 118 has a sealed configuration with an inlet 111 and an outlet 113.

The bottom 112 stores a molten metal M such as molten tin or molten tin alloy. A molten glass G supplied through the inlet 111 from a melting furnace 14 is weighted by a threshold 117 and a horizontal control tweel 119 and is introduced into the float chamber 118. While the molten glass G moves from an upstream side (a left portion in the figures) of the float chamber 118 to a downstream side (a right portion in the figures), the molten metal M flows by the molten glass G. In addition, the molten metal M flows from the upstream side to the downstream side of the float chamber 118 kept at a relatively high temperature due to the temperature gradient in the float chamber 118 and also flows from the center of the float chamber 118 in a length direction to both sides thereof. The molten glass G forms into a glass ribbon G with desired thickness and width while moving from the upstream side to the downstream side and is pulled by lift-out rollers 115 installed at the outlet 113 of the float chamber 118 to move away from the surface of the molten metal M at the take-off point. The glass ribbon G passes the lift-out rollers 115 and is delivered to an annealing lehr (not shown) of the next process.

The inside of the float chamber 118 is filled with a mixed gas of nitrogen and hydrogen. The mixed gas is kept at a pressure slightly higher than the atmospheric pressure. The molten metal M and the ribbon-shaped molten glass G are kept at about 800 to 1,300° C. by the electric resistance heating elements 114. The molten glass G is non-alkali glass, a soda lime glass, or the like. The principle or structure of generating a flow of the molten metal M in the float chamber 118 and the process of putting, forming into a ribbon shape, moving or discharging the molten glass G are already well known in the art as a floating process, and are not described in detail here.

The brick assembly 110 is configured by, for example, coupling a plurality bricks B such as refractory bricks. The brick assembly 110 may be classified into bottom lining bricks which directly stores the molten metal M and bottom insulating bricks arranged in contact with the inner surface of the bottom casing 120 to surround the bottom lining bricks. In this case, an inorganic adhesive may be filled between the bottom lining bricks and the bottom insulating bricks. Predetermined gaps are provided among the bricks B of the brick assembly 110, and these gaps are preferably appropriately determined in consideration of the elongation of the bricks caused by heating. In addition, individual bricks M should have corrosion resistance against the molten metal M, alkali resistance against $K_2O$ or $Na_2O$ included in the glass G, spalling resistance according to the change of temperature of a glass product, and so on. Moreover, the brick assembly 110 includes bottom bricks B forming the bottom 112 of the float chamber 118 and side bricks B forming a side of the float chamber 118.

The bottom casing 120 is classified into a base casing 122 installed to surround the outer circumference of the bottom bricks B and a side casing 124 installed in connection with the base casing 122 to surround the side bricks B. The bottom casing 120 is preferably made of common metal rigid and thick enough to support the brick assembly 110.

The air blower 130 includes nozzle assembles 132 arranged in a predetermined pattern in a space between a support frame (not shown) supporting the float bath 100 and the bottom 112 of the float bath 100, namely the lower surface of the bottom casing 120. The air blower 130 cools the bottom casing 120 by means of the cooling air injected through the nozzle assemblies 132. The air blower 130 is operated by an operation source such as a fan 134. In other words, the brick assembly 110 and the bottom casing 120 heated by the high temperature in the float chamber 118 are cooled by the air blower 130.

The nozzle assemblies 132 of the air blower 130 are preferably designed in a predetermined pattern in order to maintain uniform temperature distribution of the float bath 100 in aspect of the quality (BOS) of the glass ribbon G.

Figure 3:
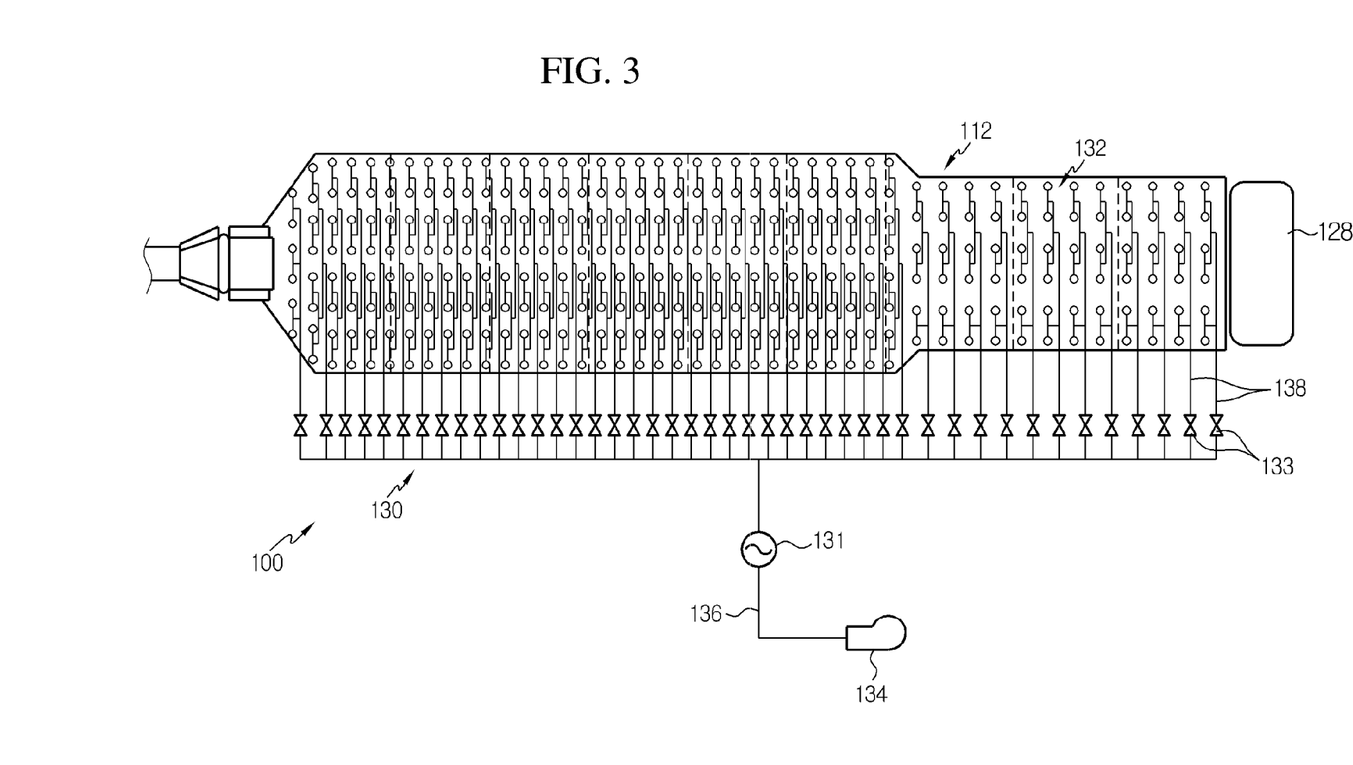
FIG. 3 is a plane view schematically showing an arrangement pattern of nozzle assemblies of an air blower according to a preferred embodiment of the present disclosure.
Figure 4:
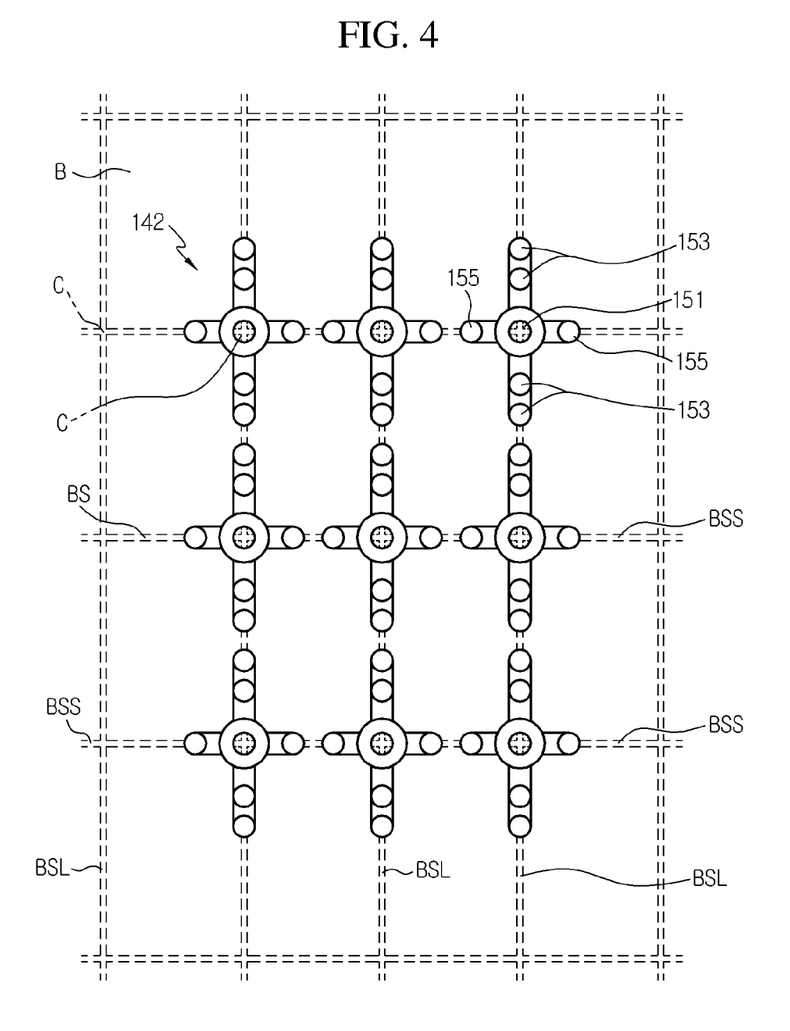
FIG. 4 is a schematic view showing a location relation between a brick assembly and the nozzle assembly of the air blower of FIG. 3.
Figure 5:
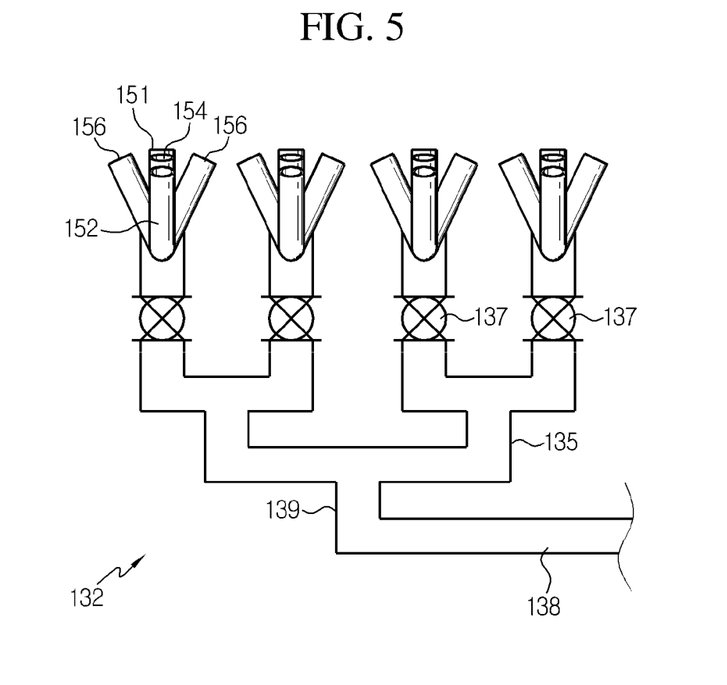
FIG. 5 is a schematic view showing a piping state of the nozzle assembly of FIG. 4.
Figure 6:
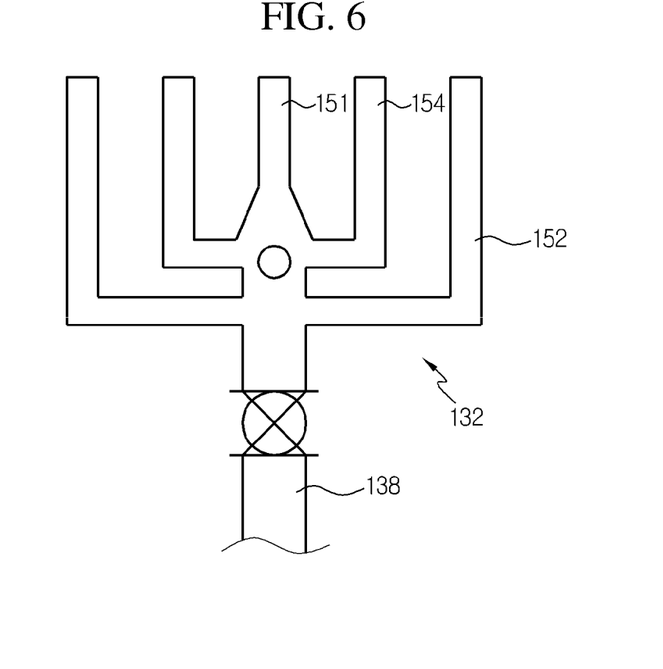
FIG. 6 is a side view showing the nozzle assembly of FIG. 4.

FIG. 3 is a plane view schematically showing an arrangement pattern of nozzle assemblies of an air blower according to a preferred embodiment of the present disclosure, FIG. 4 is a schematic view showing a location relation between a brick assembly and the nozzle assembly of the air blower of FIG. 3, FIG. 5 is a schematic view showing a piping state of the nozzle assembly of FIG. 4, and FIG. 6 is a side view showing the nozzle assembly of FIG. 4.

Referring to FIG. 3, the air blower 130 of this embodiment includes a main path 136 to which a pump 134 is installed, sub paths 138 diverging from the main path 136, and nozzle assemblies 132 respectively installed to the ends of the sub paths 138. The sub paths 138 are arranged at regular intervals in a length direction of the float bath 100. The nozzle assemblies 132 respectively located on the sub paths 138 are arranged at regular intervals in a width direction of the bottom 112. The location and number of the nozzle assemblies may be adjusted corresponding to the width of the float bath 100. A pressure gauge 131 or the like is installed on the main path 136 for stable operation of the path. A valve 133 is installed on each sub path 138 to selectively turn on/off the corresponding path. Reference symbol 128 in FIG. 3 represents a dross box where a lift-out roller 115 for drawing the formed glass ribbon G from the inside of the float chamber 118 to an annealing lehr (not shown) is installed.

Referring to FIG. 4, each nozzle assembly 132 is arranged so that its center is in agreement with a center C of a gap BS forming a boundary of adjacent bricks B. Each nozzle assembly 132 employed in this embodiment includes a center nozzle 151 oriented toward the center C of the gap BS of adjacent bricks B, long side nozzles 153 disposed to inject a cooling air from the center nozzle 151 toward long side gaps BSL formed between long sides of the bricks B, and short side nozzles 155 disposed to inject a cooling air toward short side gaps BSS formed between short sides of the bricks B to cross the long side nozzles 153 at right angles.

As shown in FIG. 5, a diverging tube 135 is installed at the end of the sub path 138 to diverge the sub path into a shape corresponding to the size of the bottom of the float bath 100. Dampers 137 for controlling an amount of the cooling air discharged through the nozzle assembly 132 are installed at the ends of the diverging tube 135.

As shown in FIG. 6, the long side nozzles 153 include two pairs of nozzles installed to face each other based on the center nozzle 151, and these nozzles are respectively installed at the ends of the first diverging tubes 152 and the second diverging tubes 154 communicating with the sub path 138.

Figure 7:
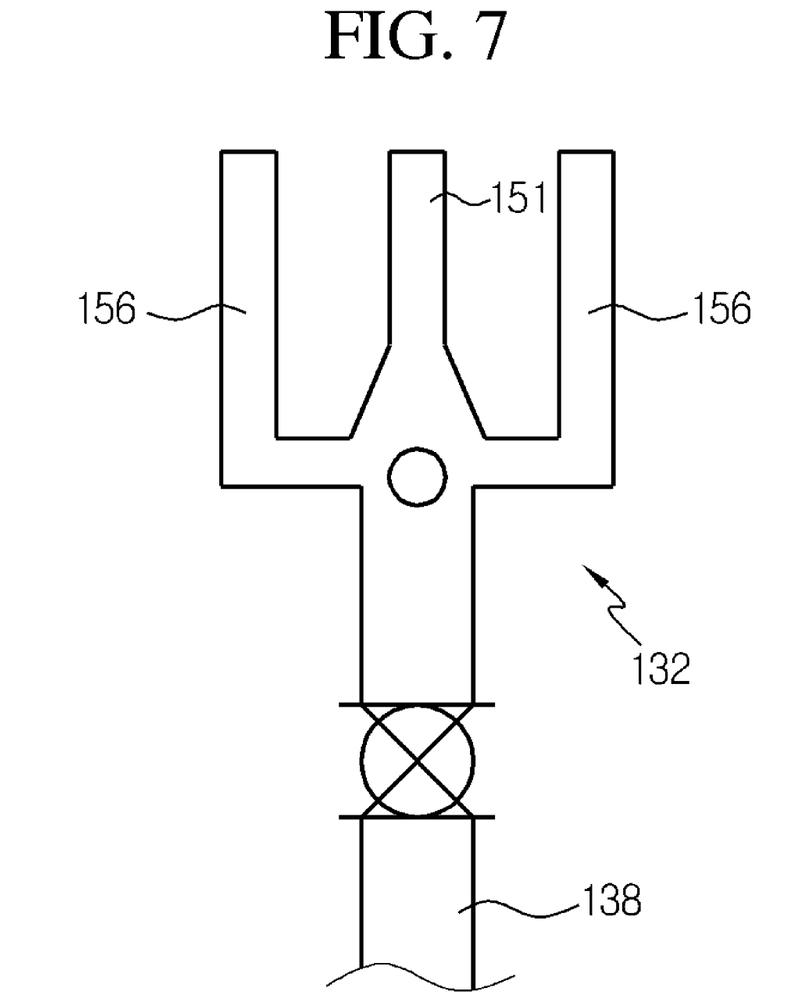
FIG. 7 is a front view showing the nozzle assembly of FIG. 6.

As shown in FIG. 7, the short side nozzles 155 include one pair of nozzles disposed to face each other based on the center nozzle 151, and these nozzles are installed at the ends of the third diverging tubes 156 communicating with the sub path 138.

If the air blower 130 having the nozzle assemblies 132 shown in FIGS. 3 to 7 is used, the center nozzle 151, the long side nozzles 153 and the short side nozzles 155 of each nozzle assembly 132 are located corresponding to the center C of the gap BS, the long side gaps BSL and the short side gaps BSS of adjacent bricks B to intensively cool the upper regions of the gaps, thereby enhancing the cooling efficiency for the bottom casing 120. In the gaps BS between the bricks B, the molten tin is solidified and present in a solid state at the bottom region of the casing 120, and the molten state is present in a molten state in a position spaced apart from the bottom by a certain distance, which form a solid-liquid interface. Here, if the temperature of the bottom casing 120 changes, the level of the solid-liquid interface changes. In this case, bubbles are generated due to the difference in the degrees of gas saturation between the solid state and the liquid state, which becomes one of fatal factors influencing the glass quality. Therefore, the glass quality may be improved by effective cooling using the nozzle pattern according to the preferred embodiment of the present disclosure.

Meanwhile, it is apparent to those of ordinary skill in the art that the number of the long side nozzles 153 and the short side nozzles 155 may be selected variously according to the length and arrangement of the bricks.

Figure 8:
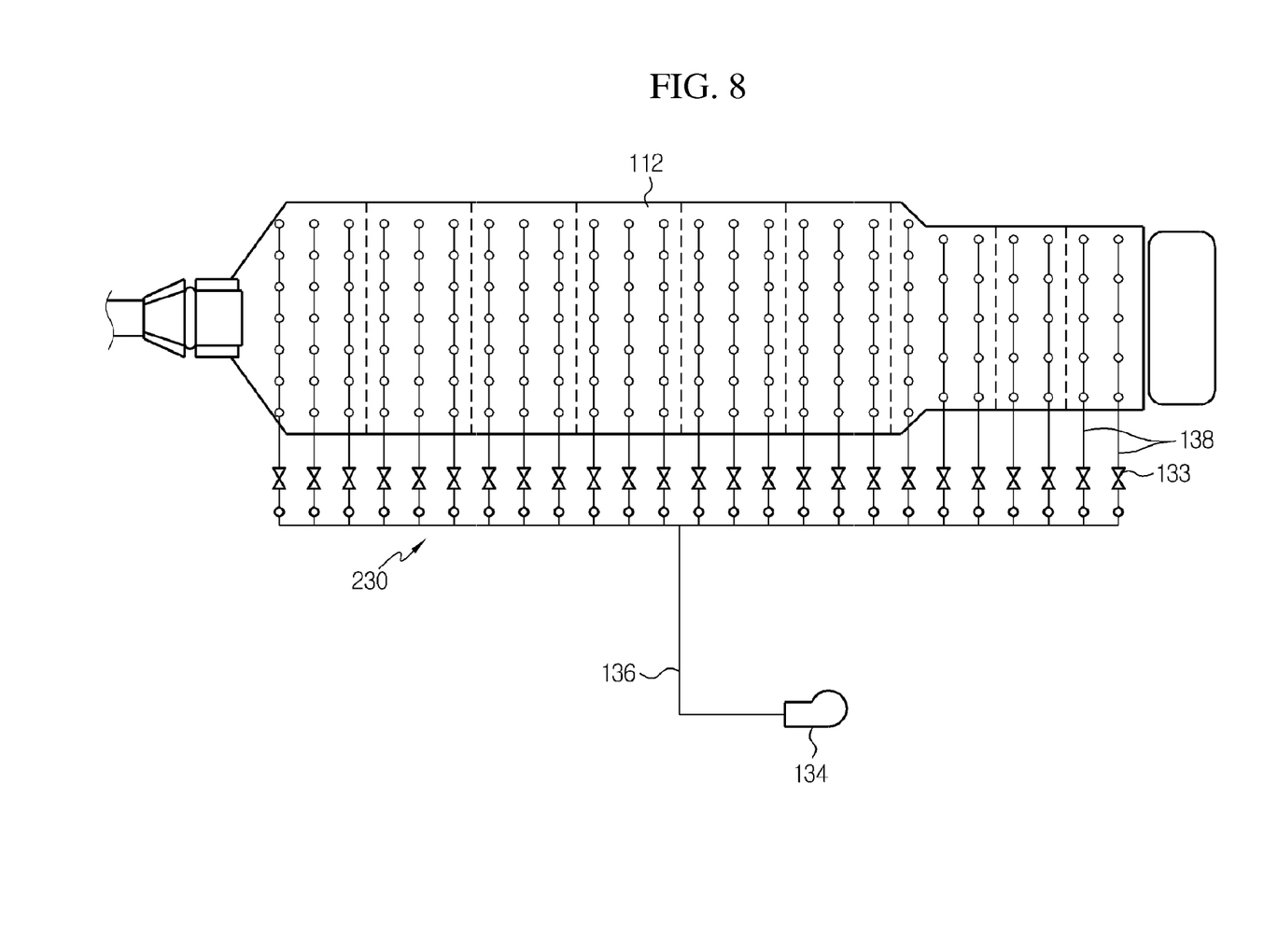
FIG. 8 is a plane view schematically showing an arrangement pattern of an air blower according to another embodiment of the present disclosure.
Figure 9:
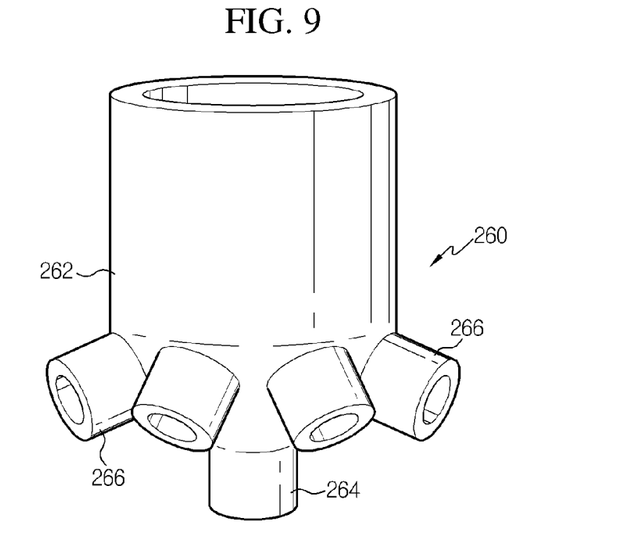
FIG. 9 is a perspective view showing an individual nozzle assembly employed in the air blower of FIG. 8.
Figure 10:
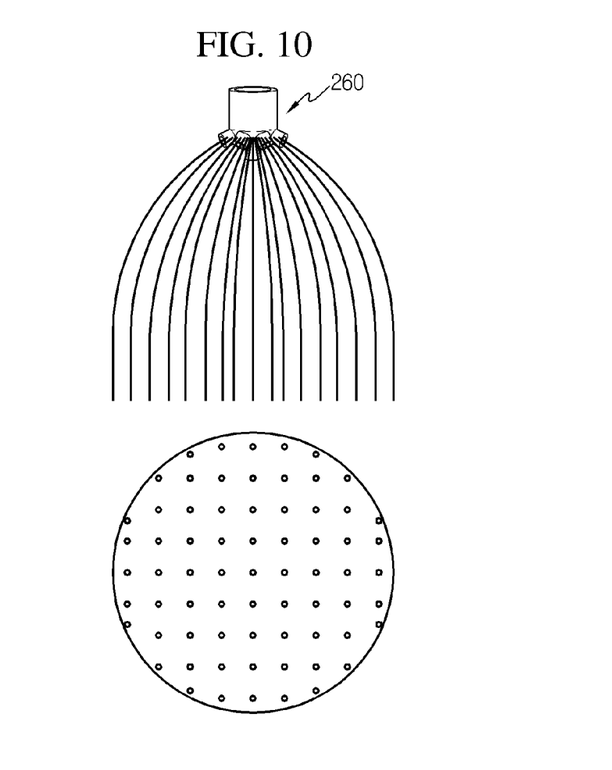
FIG. 10 is a schematic view showing an injecting pattern of a cooling air injected from the nozzle assembly of FIG. 9.

FIG. 8 is a plane view schematically showing an arrangement pattern of an air blower according to another embodiment of the present disclosure, FIG. 9 is a perspective view showing an individual nozzle assembly employed in the air blower of FIG. 8, and FIG. 10 is a schematic view showing an injecting pattern of a cooling air injected from the nozzle assembly of FIG. 9. The same component indicated by the same reference symbol as in FIGS. 3 to 7 is identical to that of FIGS. 3 to 7 with the same function.

Referring to FIGS. 8 to 10, an air blower 230 of this embodiment includes a bundle-type radial nozzle assembly 260 provided to the end of each sub path 138, different from the former embodiment. The radial nozzle assembly 260 includes a first nozzle 264 installed at the center of a nozzle body 262, and a plurality of second nozzles 266 disposed in a radial direction around the first nozzle 264. In an alternative embodiment, the radial nozzle assembly 260 may have a nozzle cover (not shown) having a plurality of random nozzle holes and attached to the end of the nozzle body 262, as apparent to those of ordinary skill in the art.

The radial nozzle assembly 260 is used for injecting a cooling air in a radial direction within a predetermined radius from the center C of the border BS of the bricks B. In other words, the radial nozzle assembly 260 of this embodiment allows a cooling air to be injected as much as a predetermined radius (at least a half of the length of the long side of the brick) from the center C of the gap BS of the bricks B so as to cool not only the gap BS between the bricks B but also neighboring bricks B. Therefore, the cooling effect of this embodiment is better than that of the former embodiment. Even in this case, the flow rate of the supplied cooling air and the size of the radial nozzle assembly 260 may be adjusted appropriately, as apparent to those of ordinary skill in the art.

Next, the cooling method of the float bath for manufacturing a float glass according to a preferred embodiment of the present disclosure will be described. In the method of cooling a float bath for manufacturing a float glass, the bottom casing 120 surrounding the brick assembly 110 capable of storing a molten metal M so that a float glass moves forward while floating on the molten metal M is cooled by an air supplied from the plurality of nozzle assemblies 132 installed below the bottom casing 120, wherein the nozzles 151, 153 and 155 of the nozzle assembly 132 are configured corresponding to gaps BS formed between the bricks B of the brick assembly and disposed below the bottom casing 120 to particularly cool the gaps BS of the bricks, thereby enhancing the cooling efficiency.

In a cooling method of a float bath according to another embodiment of the present disclosure, the air blower 230 having the radial nozzle assembly 260 capable of injecting a cooling air exactly to a center of the gap BS of adjacent bricks B so that the cooling air extends in a radial direction within a predetermined radius from the center, thereby cooling the bottom casing 120 more efficiently.

Meanwhile, the molten glass G put into the float chamber 118 may form a float glass with better quality since the level of BOS which may be caused in forming the glass ribbon G may be lowered by efficiently cooling the bottom casing 120 of the float bath 100.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

| Reference Symbols | |
| --- | --- |
| M: | molten metal |
| G: | molten glass, glass ribbon |
| B: | brick |
| BS: | gap |
| 110: | brick assembly |
| 111: | inlet |
| 112: | bottom |
| 113: | outlet |
| 114: | heating element |
| 115: | lift-out roller |
| 116: | roof |
| 117: | threshold |
| 118: | float chamber |
| 119: | horizontal control tweel |
| 120: | bottom casing |
| 122: | base casing |
| 124: | side casing |
| 130, 230: | air blower |
| 132: | nozzle assembly |
| 134: | pump |
| 135: | diverging tube |
| 136: | main path |
| 137: | damper |
| 138: | sub path |
| 151: | center nozzle |
| 153: | long side nozzle |
| 155: | short side nozzle |
| 260: | radial nozzle assembly |
| 262: | nozzle body |
| 264: | first nozzle |
| 266: | second nozzle |

What is claimed is:

1. A float bath for manufacturing a float glass, comprising:
a brick assembly composed of a plurality of bricks to store a molten metal so that a float glass is capable of moving forward while floating on the molten metal;
a bottom casing for forming an outer side of the brick assembly; and
an air blower installed under the bottom casing to supply a cooling air toward the bottom casing,
wherein the air blower is disposed so that the cooling air is injected toward gaps between the bricks,
wherein the air blower includes a plurality of nozzle assemblies disposed under the bottom casing by a predetermined distance, and
wherein each of the nozzle assemblies includes:
a center nozzle oriented toward a center of a border of adjacent bricks;
a long side nozzle unit disposed to be oriented toward a border of long sides of the bricks from the center nozzle; and
a short side nozzle unit disposed to be oriented toward a border of short sides of the bricks to cross the long side nozzle unit at a right angle.

2. The float bath for manufacturing a float glass according to claim 1,
wherein each of the nozzle assemblies includes a radial nozzle unit capable of injecting a cooling air in a radial direction from a center of a border of the bricks within a predetermined radius.

3. A float bath for manufacturing a float glass, comprising:
a brick assembly composed of a plurality of bricks to store a molten metal so that a float glass is capable of moving forward while floating on the molten metal;
a bottom casing for forming an outer side of the brick assembly; and
an air blower installed under the bottom casing to supply a cooling air toward the bottom casing,
wherein the air blower is disposed so that the cooling air is injected exactly to a center of a border of adjacent bricks,
wherein the air blower includes a plurality of nozzle assemblies disposed under the bottom casing by a predetermined distance, and
wherein each of the nozzle assemblies includes:
a center nozzle oriented toward a center of a border of adjacent bricks;
a long side nozzle unit disposed to be oriented toward a border of long sides of the bricks from the center nozzle; and
a short side nozzle unit disposed to be oriented toward a border of short sides of the bricks to cross the long side nozzle unit at a right angle.

4. The float bath for manufacturing a float glass according to claim 3,
wherein each of the nozzle assemblies includes a radial nozzle unit capable of injecting a cooling air in a radial direction from a center of a border of the bricks within a predetermined radius.

* * * * *